United States Patent
Chen et al.

(10) Patent No.: US 10,181,934 B2
(45) Date of Patent: Jan. 15, 2019

(54) NON-ORTHOGONAL MULTIPLE ACCESS BETWEEN A UNICAST SIGNAL AND A SINGLE-CELL POINT-TO-MULTIPOINT SIGNAL

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/144,133

(22) Filed: May 2, 2016

(65) Prior Publication Data

US 2016/0353452 A1    Dec. 1, 2016

Related U.S. Application Data

(60) Provisional application No. 62/166,544, filed on May 26, 2015.

(51) Int. Cl.
*H04W 4/00*         (2018.01)
*H04L 5/00*         (2006.01)
(Continued)

(52) U.S. Cl.
CPC ........ *H04L 5/0048* (2013.01); *H04J 11/0056* (2013.01); *H04L 5/0073* (2013.01); *H04L 5/0044* (2013.01); *H04L 27/3488* (2013.01)

(58) Field of Classification Search
None
See application file for complete search history.

(56) References Cited

U.S. PATENT DOCUMENTS 8,170,160 B1 *   5/2012   Shi ................. H04L 27/261
                                                          375/347
8,879,470 B2 *  11/2014   Zhang ................. H04B 7/024
                                                          342/154
(Continued)

FOREIGN PATENT DOCUMENTS

CN      101584228 A      11/2009
CN      104010199 A       8/2014
CN      104081697 A      10/2014

OTHER PUBLICATIONS

Hu C., et al., "Power Allocation in Cellular Systems with Multicast and Unicast Hybrid Service", 2012 8th International Conference on Wireless Communications, Networking and Mobile Computing (WICOM 2012):Shanghai, China, Sep. 21-23, 2012, IEEE, Piscataway, NJ, XP032342841, Sep. 21, 2012 (Sep. 21, 2012), pp. 1-4, DOI: 10.11 09/WICOM.2012.6478620, ISBN: 978-1-61284-684-2.

(Continued)

*Primary Examiner* — Anh Vu H Ly
(74) *Attorney, Agent, or Firm* — Nerrie M. Zohn

(57) ABSTRACT

The present disclosure provides NOMA between a unicast PDSCH signal and a SC-PTM signal. The apparatus receives, at a first UE, a combined signal including a first data transmission and a second data transmission. The apparatus also determines at the first UE, a first set of symbols for the first data transmission intended for the first UE. The apparatus further determines at the first UE, a second set of symbols for the second data transmission intended for a second UE. In an aspect, the first data transmission and the second data transmission include at least one overlapping resource element. In another aspect, the first set of symbols and the second set of symbols differ by at least one symbol. The apparatus also decodes, at the first UE, the first data transmission, based at least in part on (Continued)

the determined first set of symbols and the determined second set of symbols.

29 Claims, 10 Drawing Sheets

(51) Int. Cl.
*H04J 11/00* (2006.01)
*H04L 27/34* (2006.01)

(56) References Cited

U.S. PATENT DOCUMENTS

| | | | | |
|---|---|---|---|---|
| 2007/0250638 A1* | 10/2007 | Kiran | ............... | H04L 1/0006 709/236 |
| 2008/0176593 A1 | 7/2008 | Bachl et al. | | |
| 2009/0175214 A1* | 7/2009 | Sfar | ............... | H04B 7/15592 370/315 |
| 2009/0262699 A1* | 10/2009 | Wengerter | ............... | H04L 1/0072 370/330 |
| 2010/0246711 A1* | 9/2010 | Kishigami | ............... | H04L 5/0039 375/295 |
| 2010/0254352 A1* | 10/2010 | Wang | ............... | H04W 72/005 370/332 |
| 2010/0272004 A1* | 10/2010 | Maeda | ............... | H04L 5/0007 370/312 |
| 2011/0149824 A1* | 6/2011 | Tong | ............... | H04B 7/0689 370/312 |
| 2011/0206170 A1* | 8/2011 | Wilborn | ............... | H04B 1/7107 375/346 |
| 2011/0235562 A1* | 9/2011 | Tong | ............... | H04B 7/0874 370/312 |
| 2012/0213130 A1* | 8/2012 | Zhang | ............... | H04L 5/001 370/280 |
| 2013/0003573 A1* | 1/2013 | Reznik | ............... | H04W 16/14 370/252 |
| 2014/0153472 A1* | 6/2014 | Phan | ............... | H04L 5/0032 370/312 |
| 2015/0156657 A1* | 6/2015 | Ji | ............... | H04B 7/024 370/228 |
| 2015/0326360 A1* | 11/2015 | Malladi | ............... | H04L 5/0032 370/329 |
| 2016/0013897 A1* | 1/2016 | Sun | ............... | H04L 1/0058 370/312 |
| 2016/0261380 A1* | 9/2016 | Ko | ............... | H04L 1/1812 370/329 |
| 2016/0337018 A1* | 11/2016 | Hwang | ............... | H04L 5/003 370/389 |
| 2017/0150419 A1* | 5/2017 | Li | ............... | H04B 7/024 370/389 |
| 2017/0187493 A1* | 6/2017 | Lincoln | ............... | H04L 1/0631 375/346 |

OTHER PUBLICATIONS

International Search Report and Written Opinion—PCT/US2016/030599—ISA/EPO—dated Jul. 26, 2016.
Kim D., et al., "Superposition of Broadcast and Unicast in Wireless Cellular Systems", Service Center, Piscataway, US, XP011229487, ISSN: 0163-6804, pp. 110-117.

* cited by examiner

NON-ORTHOGONAL MULTIPLE ACCESS BETWEEN A UNICAST SIGNAL AND A SINGLE-CELL POINT-TO-MULTIPOINT SIGNAL

CROSS-REFERENCE TO RELATED APPLICATION(S)

This application claims the benefit of U.S. Provisional Application Ser. No. 62/166,544, entitled "NON-ORTHOGONAL MULTIPLE ACCESS (NOMA) BETWEEN A PHYSICAL DOWNLINK SHARED CHANNEL (PDSCH) SIGNAL AND SINGLE-CELL POINT-TO-MULTIPOINT (SC-PTM) SIGNAL" and filed on May 26, 2015, which is expressly incorporated by reference herein in its entirety.

BACKGROUND

Field

The present disclosure relates generally to communication systems, and more particularly, to NOMA between a unicast PDSCH signal and a SC-PTM signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Multiuser (MU) Superposition Transmission (MUST) is a joint optimization of MU operation from the perspective of both the user equipment (UE) and the evolved Node B (eNB) that may improve system capacity even if the transmission and/or precoding is non-orthogonal. SC-PTM is a type of transmission in which the PDSCH may be used to target transmissions for a group of UEs. While current MUST operation generally targets unicast PDSCH transmissions, there is also a need to extend MUST operations to include physical multicast channel (PMCH) transmissions and/or SC-PTM transmissions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

MUST is a joint optimization of MU operation from the perspective of both the UE and the eNB that improves system capacity even if the transmission and/or precoding is non-orthogonal. SC-PTM is a type of transmission in which the PDSCH may be used to target transmissions for a group of UEs. While current MUST operation generally targets unicast PDSCH transmissions (e.g., different unicast transmission each intended for a specific UE), there is also a need to extend MUST operations to include PMCH transmissions (e.g., SC-PTM transmissions). UEs with better channel conditions may receive eMBMS services via the PMCH transmissions with higher date rates/high quality compared with UEs with worse channel conditions.

The present disclosure provides a solution to this problem by enabling MUST between one or more unicast transmissions and an SC-PTM transmission. For example, one or more unicast transmissions and an SC-PTM transmission may be combined such that resource blocks (RBs) and/or symbols used to transmit the one or more unicast transmissions may partially overlap with RBs used to transmit the SC-PTM transmission. In an aspect, the PDSCH of the SC-PTM transmission may be the base layer of the combined signal, while the PDSCH of the one or more unicast transmissions may be an enhancement layer of the combined signal. In other words, the UEs receiving the SC-PTM transmission may decode the SC-PTM transmission without interference cancellation, while the UE(s) receiving the one or more unicast transmissions may perform interference cancellation due to the SC-PTM for the overlapping RBs prior to decoding the unicast transmission.

In this way, the present disclosure is able to provide MUST between one or more unicast transmissions and an SC-PTM transmission.

In an aspect of the disclosure, a method, a computer-readable medium, and an apparatus are provided. The apparatus may receive, at a first UE, a combined signal including a first data transmission and a second data transmission. The apparatus also may determine at the first UE, a first set of symbols for the first data transmission intended for the first UE. The apparatus may further determine at the first UE, a second set of symbols for the second data transmission intended for a second UE. In an aspect, the first data transmission and the second data transmission may include at least one overlapping resource element. In another aspect, the first set of symbols and the second set of symbols may differ by at least one symbol. The apparatus may also decode, at the first UE, the first data transmission, based at least in part on the determined first set of symbols and the determined second set of symbols.

In another aspect, the apparatus generates a first data transmission for a first group of UEs. The apparatus also generates a second data transmission for a second group of UEs. The apparatus further combines the first data transmission and the second data transmission into a combined signal. In addition, the apparatus transmits the combined signal to the first group of UEs and the second group of UEs. In an aspect, the first data transmission and the second data transmission may include at least one overlapping resource element. In a further aspect, the first set of symbols and the second set of symbols may differ by at least one symbol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
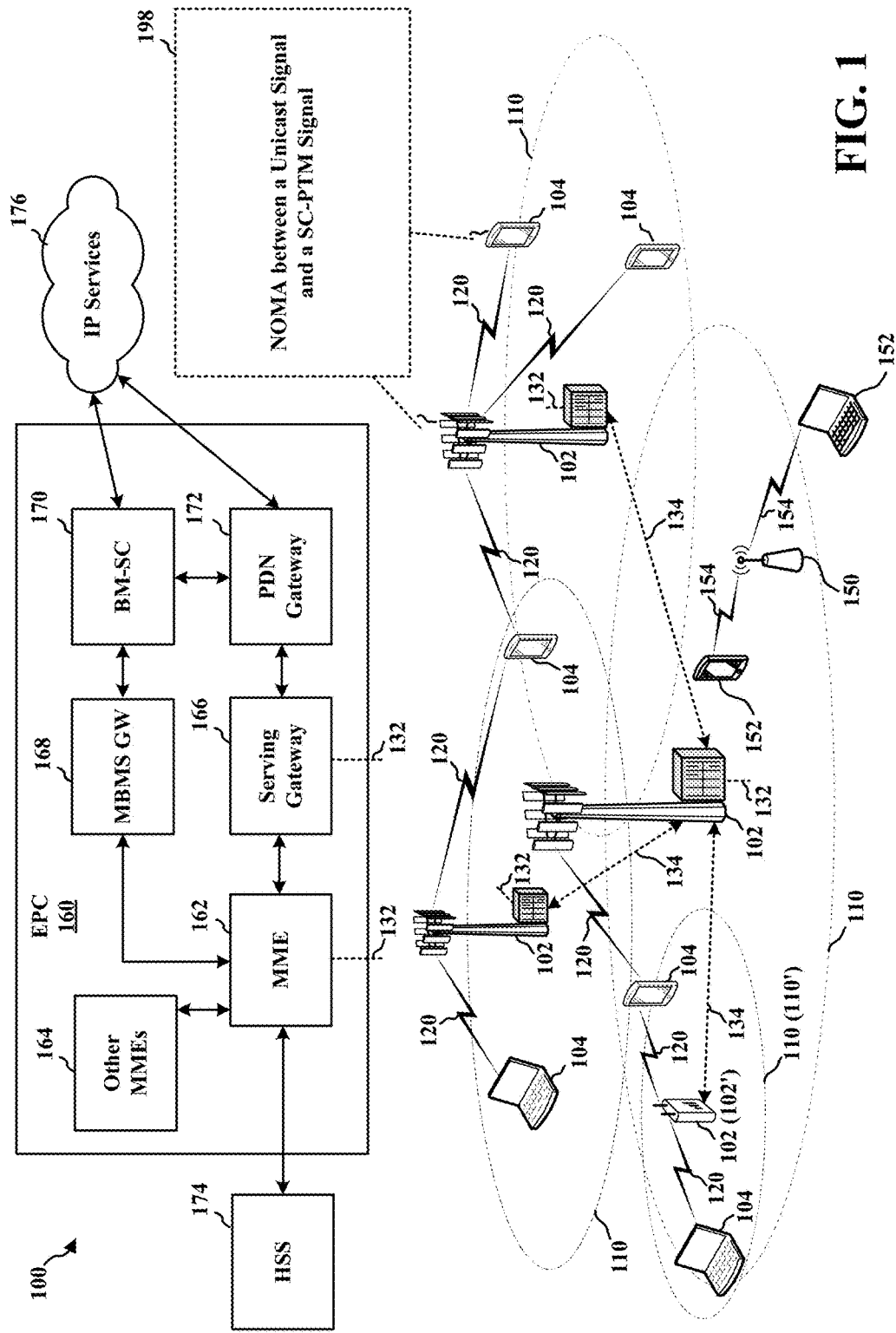
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to enable NOMA between a unicast PDSCH signal and a SC-PTM PDSCH signal (198).

Figure 2:
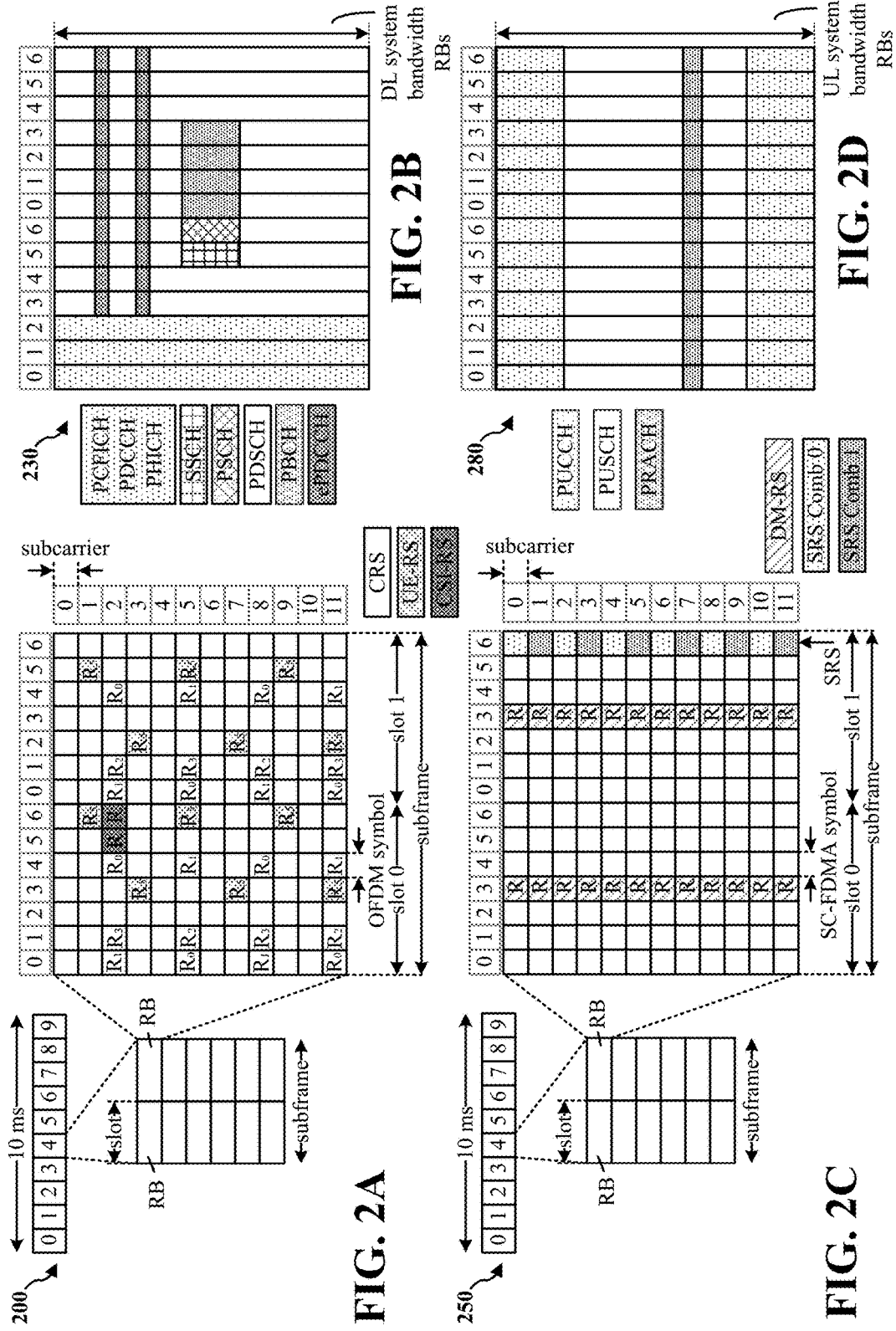
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
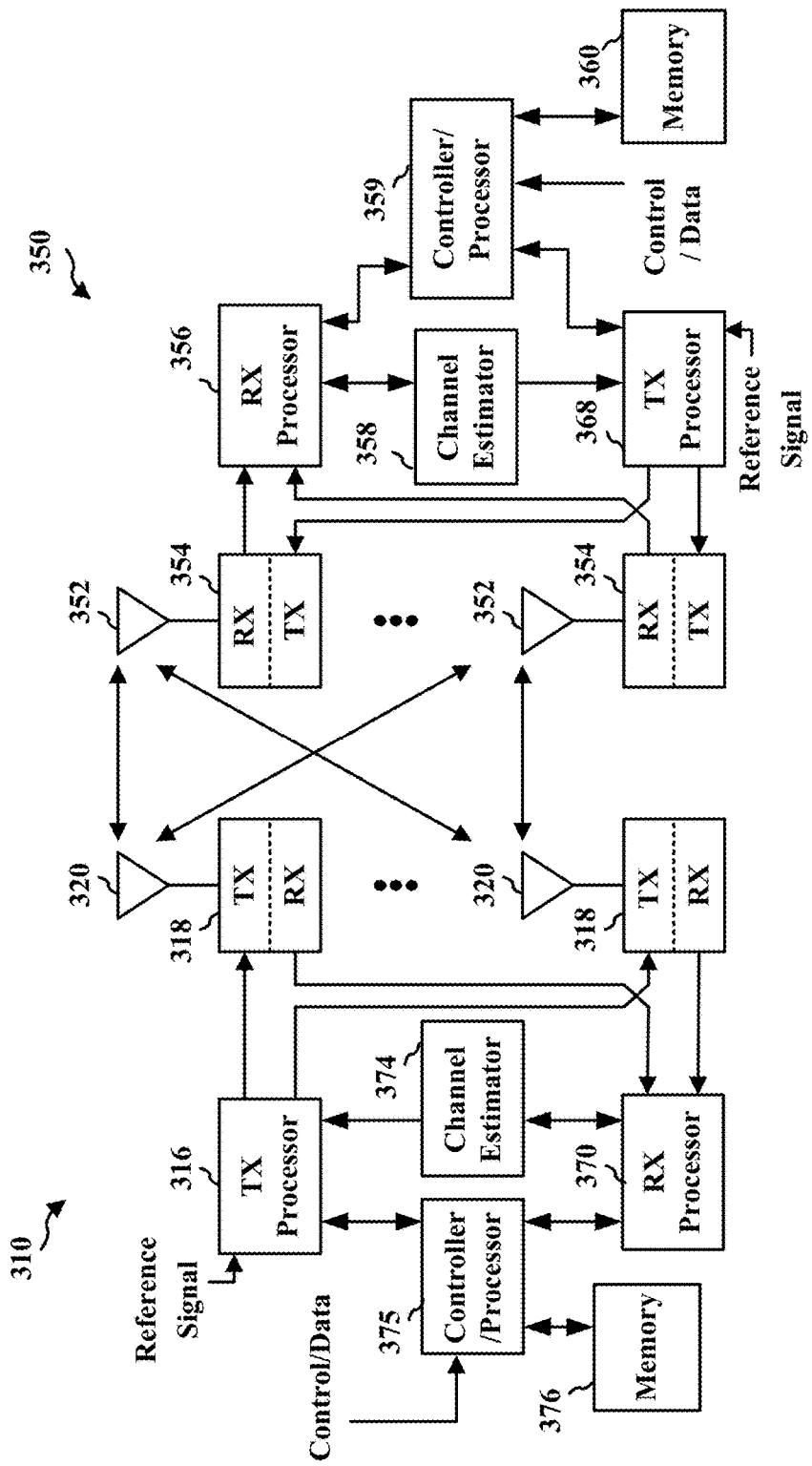
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

MUST is a joint optimization of MU operation from the perspective of both the UE and the eNB that may improve system capacity even if the transmission and/or precoding is non-orthogonal. SC-PTM is a type of transmission in which the PDSCH may be used to target transmissions for a group of UEs. While current MUST operation generally targets unicast PDSCH transmissions (e.g., different unicast transmission each intended for a specific UE), there is also a need to extend MUST operations to include PMCH transmissions (e.g., SC-PTM transmissions). UEs with better channel conditions may receive eMBMS services via the PMCH transmissions with higher date rates/high quality compared with UEs with worse channel conditions.

The present disclosure provides a solution to this problem by enabling MUST between one or more unicast transmissions and an SC-PTM transmission. For example, one or more unicast transmissions and an SC-PTM transmission may be combined such that RBs and/or symbols used to transmit the one or more unicast transmissions may partially overlap with RBs and/or symbols used to transmit the SC-PTM transmission. In an aspect, the PDSCH of the SC-PTM transmission may be the base layer of the combined signal, while the PDSCH of the one or more unicast transmissions may be an enhancement layer of the combined signal. In other words, the UEs receiving the SC-PTM transmission may decode the SC-PTM transmission without interference cancellation, while the UE(s) receiving the one or more unicast transmissions may perform interference cancellation due to the SC-PTM for the overlapping RBs prior to decoding the unicast transmission.

In this way, the present disclosure is able to provide MUST between one or more unicast transmissions and an SC-PTM transmission.

Figure 4:
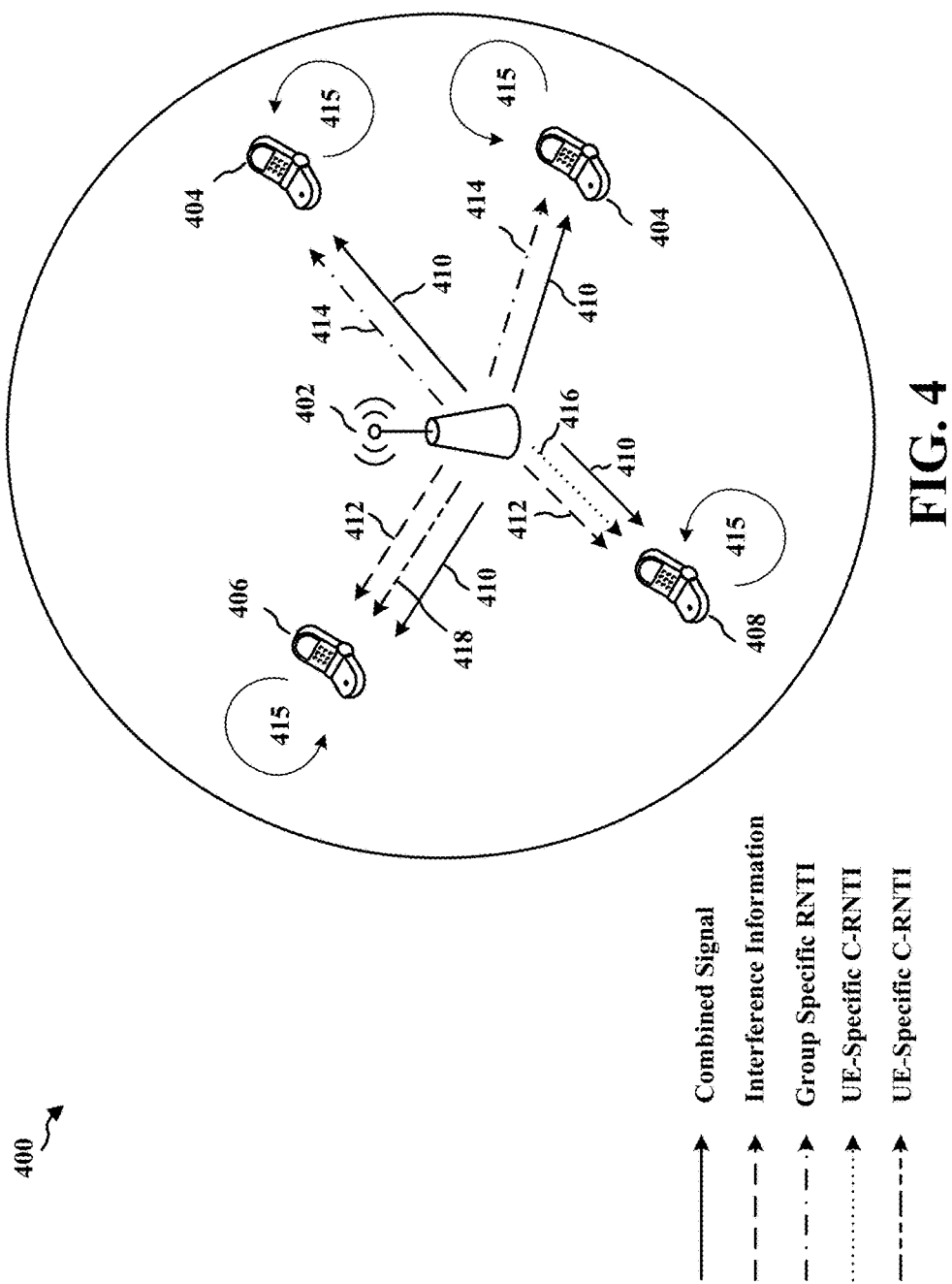
FIG. 4 is a diagram of an MU communications system in accordance with one aspect of the present disclosure.

FIG. 4 is a diagram of a MU communications system 400 that provides MUST (e.g., combined signal 410) for one or more unicast PDSCH signals (e.g., separate unicast transmissions for UEs 406, 408) and an SC-PTM PDSCH signal (e.g., transmission for a plurality of UEs 404).

Referring to FIG. 4, the eNB 402 and/or UEs 404, 406, 408 may include multiple antennas for employing antenna diversity schemes that may improve communication quality and reliability. Additionally or alternatively, eNB 402 and/or UEs 404, 406, 408 may employ MIMO techniques that may take advantage of multi-path environments to transmit multiple spatial layers carrying the same or different coded data. MIMO techniques include single-user MIMO (SU-MIMO) techniques in which the same or different data streams are communicated on multiple layers between an eNB 402 and a single UE. MIMO techniques also include multiple-user MIMO (MU-MIMO) in which multiple streams may be transmitted to or received from spatially-distinguishable UEs.

For DL-MIMO transmissions, the mode used for a transmission by the eNB 402 may be defined by a transmission strategy (TS). TSs may include a variety of techniques for allocation of resources to UEs 404, 406, 408. For example, signals to different UEs 404, 406, 408 may be differentiated by NOMA techniques. One NOMA technique that may be used is a power split between UEs 404, 406, 408 where the total transmit power for a set of resources is split between a plurality of UEs 404, 406 408. The combined signal 410 may include a first unicast PDSCH transmission intended for a first UE 406, a second unicast PDSCH transmission intended for a second UE 408, and a SC-PTM PDSCH transmission intended for a group of UEs 404.

In addition, the combined signal 410 may include a plurality of layers. For example, the combined signal 410 (e.g., a NOMA transmission) may include the simultaneous transmission of a large number of non-orthogonal beams/layers with the possibility of more than one layer of data transmission in a beam. In an aspect, the first unicast PDSCH transmission (e.g., signal to UE 406) may be a first enhancement layer of the combined signal 410, the second unicast PDSCH transmission (e.g., signal to UE 408) may be a second enhancement layer of the combined signal 410, and the SC-PTM PDSCH transmission (e.g., signal to the plurality of UEs 404) may be a base layer of the combined signal 410. The number of layers of the SC-PTM PDSCH transmission in the combined signal 410 may be limited to one. However, more than one SC-PTM layer is possible. In addition, the number of layers for unicast PDSCH transmission in the combined signal 410 maybe one or more. In other words, the unicast PDSCH transmission may be transmitted using SIMO or SU-MIMO operations. In one aspect, the combined signal 410 may include a first unicast PDSCH transmission, a second unicast PDSCH transmission that partially overlaps the resources and/or symbols of the first unicast PDSCH transmission, and an SC-PTM transmission that also partially overlaps the resources and/or symbols of the first and/or second unicast PDSCH transmission.

Each of the UEs 404, 406, 408 may determine 415 a first set of symbols in the combined signal 410 for a first data transmission (e.g., the first unicast transmission, the second unicast transmission, or the SC-PTM transmission) intended for that specific UE. In addition, each of the UEs 404, 406, 408 may determine 415 a second set of symbols for one or more second data transmissions (e.g., the first unicast transmission, the second unicast transmission, or the SC-PTM transmission) included in the combined signal 410 intended for a different UE. In an aspect, the first data transmission and the second data transmission may include at least one overlapping RE. In a further aspect, the first set of symbols and the second set of symbols differ by at least one symbol. In yet a further aspect, a starting symbol of the first data transmission may be different than a starting symbol of second data transmission. Based at least in part on the determined first set of symbols and the determined second set of symbols, each of the UEs 404, 406, 408 may decode 415 the data transmission intended for that specific UE from the combined signal.

The group of UEs 404 receiving the SC-PTM PDSCH transmission may perform detection as is. That is, the group of UEs 404 may decode the SC-PTM PDSCH transmission from the combined signal 410 without performing interference cancellation (e.g., when the SC-PTM PDSCH transmission is the base layer of the combined signal 410). In contrast, the UEs 406, 408 each receiving a unicast PDSCH transmission may need to perform interference cancellation before decoding their respective unicast PDSCH transmissions. This is because the resources and/or symbols used for the SC-PTM PDSCH transmission in the base layer may overlap with resources and/or symbols used for the first and/or second unicast PDSCH transmissions in the first and/or second enhancement layers. UEs 406, 408 may cancel interference using interference cancellation information 412 sent from the eNB 402. For example, the SC-PTM modulation and coding scheme (MCS) may correspond to a lower signal-to-interference plus-noise ratio (SINR) operation condition, such that unicast PDSCH UE(s) 406, 408 operating with higher SINR can decode and cancel SC-PTM before decoding the unicast PDSCH transmission.

As discussed supra, the resources occupied by the unicast PDSCH transmission(s) and the SC-PTM PDSCH transmission in the combined signal 410 may at least partially overlap. In one example embodiment, one or more of the unicast PDSCH transmission(s) may be located in RBs 5-15, while the SC-PTM PDSCH transmission is located in RBs 8-12 in the combined signal 410. In another example embodiment, one or more of the unicast PDSCH transmission(s) may be located in symbols 1-13, while SC-PTM PDSCH transmission is located in symbols 3-13 in the combined signal 410.

Still referring to FIG. 4, the corresponding control channel and data channel of the group of UEs 404 may be scrambled by a group-specific RNTI 414 that is signalled from the eNB 402. The corresponding control channel and data channel for each of the unicast UEs 406, 408 may each be scrambled by a UE-specific cell RNTI (C-RNTI) 416, 418 that is signalled from the eNB 402. Each UE in the group of UEs 404 may decode the SC-PTM PDSCH transmission in the combined signal 410 using the group-specific RNTI. In addition, each UE 406, 408 may decode a respective unicast PDSCH transmission in the combined signal 410 using a respective UE-specific C-RNTI.

In an aspect, SC-PTM operation may or may not rely on CSI feedback from the group of UEs 404. In addition, SC-PTM operation may or may not include a HARQ operation. Even when SC-PTM operation includes a HARQ operation, there may be a HARQ feedback mechanism that does not include physical layer HARQ feedback from the group of UEs 404.

In an aspect, the reference signal (RS) type for the unicast PDSCH transmission and SC-PTM PDSCH transmission may be the same. For example, the RS type may be based on a DM-RS, UE-RS, or a CRS. In an aspect, the RS type for the unicast PDSCH transmission and SC-PTM PDSCH transmission may be different. For example, one of the unicast PDSCH transmissions may use a CRS and the SC-PTM PDSCH transmission may use a DM-RS, or vice versa. In an example embodiment, the unicast PDSCH transmission may be DM-RS based but the SC-PTM PDSCH transmission may be CRS based. In this example embodiment, the SC-PTM PDSCH transmission may rate match around DM-RS REs of the unicast PDSCH transmission (e.g., excludes 24 DM-RS REs per RB of the unicast PDSCH transmission). Similarly, if the unicast PDSCH transmission is CRS based but the SC-PTM PDSCH transmission is DM-RS based, the SC-PTM PDSCH transmission may rate match around CRS REs of the unicast PDSCH transmission.

In an aspect, precoding for the SC-PTM PDSCH transmission and the unicast PDSCH transmission(s) may be the same or different. The cyclic prefix (CP) type for the unicast PDSCH transmission and the SC-PTM PDSCH transmission may be the same. The presence and corresponding parameters of the SC-PTM PDSCH signal may be indicated to any unicast UE(s) 406, 408 via the control channel. For example, the corresponding parameters of the SC-PTM PDSCH transmission may be be indicated via interference cancellation information 412 transmitted from the eNB 402 to UEs 406, 408 each receiving a separate unicast PDSCH transmission.

In this way, the present disclosure is able to provide MUST between one or more unicast transmissions and an SC-PTM transmission.

Figure 5:
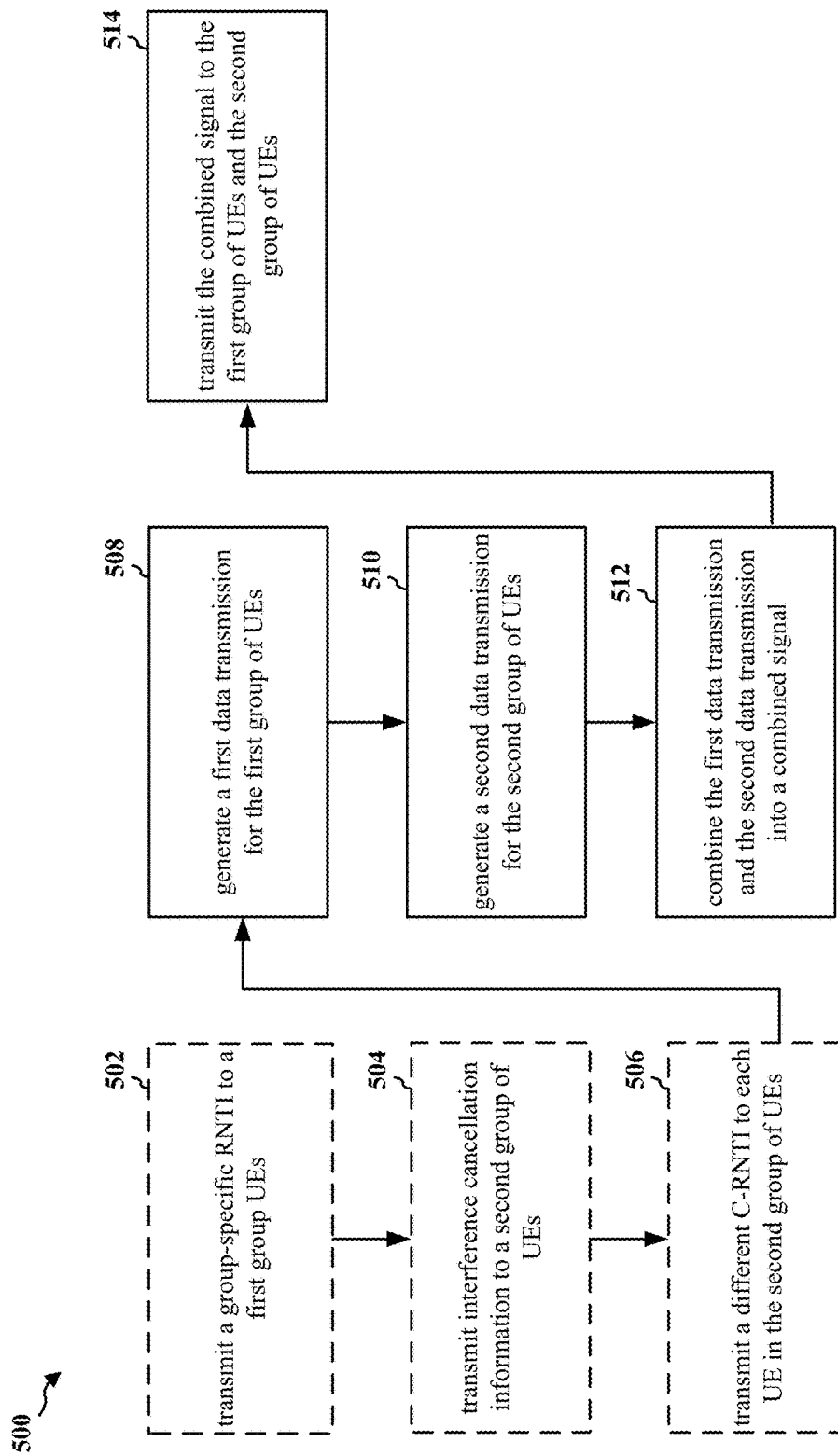
FIG. 5 is a flowchart of a method of wireless communication.

FIG. 5 is a flowchart 500 of a method of wireless communication. The method may be performed by an eNB (e.g., the eNB 402, the apparatus 602/602'). It should be understood that the operations indicated with dashed lines represent optional operations for various aspects of the disclosure.

At 502, the eNB may transmit a group-specific RNTI to a first group of UEs. For example, referring to FIG. 4, the corresponding control channel and data channel of a group of UEs 404 may be scrambled by a group-specific RNTI 414 that is signalled from the eNB 402 to the group of UEs 404. In an aspect, the eNB 404 may transmit information associated with the group-specific RNTI to each UE in the first group of UEs (e.g., UEs 404).

At 504, the eNB may transmit interference cancellation information to a second group of UEs. For example, referring to FIG. 4, the eNB 402 may transmit interference cancellation information 412 to the UEs 406, 408. UEs 406, 408 may need to cancel interference since the resources and/or symbols used for the SC-PTM PDSCH transmission in the enhancement layer may overlap with resources and/or symbols used in the first and/or second enhancement layers used for the first and/or second unicast PDSCH transmissions. UEs 406, 408 may perform interference cancellation using interference cancellation information 412 sent from the eNB 402.

At 506, the eNB may transmit a different C-RNTI to each UE in the second group of UEs. For example, referring to FIG. 4, the corresponding control channel and data channel for each of the unicast UEs 406, 408 may each be scrambled by a UE-specific C-RNTI 416, 418 that is signalled from the eNB 402. The eNB 402 may transmit information associated with a unique UE-specific C-RNTI to each UE 406, 408.

At 508, the eNB may generate a first data transmission for the first group of UEs. For example, referring to FIG. 4, the eNB 402 may generate an SC-PTM PDSCH transmission intended for a group of UEs 404.

At 510, the eNB may generate a second data transmission for the second group of UEs. For example, referring to FIG. 4, the eNB 402 may generate a first unicast PDSCH transmission intended for UE 406 and a second unicast PDSCH transmission intended for UE 408. Here, the first and second unicast PDSCH transmissions may be different.

At 512, the eNB may combine the first data transmission and the second data transmission into a combined signal. For example, referring to FIG. 4, the eNB 402 may combine a first unicast PDSCH transmission intended for UE 406, a second unicast PDSCH transmission intended for UE 408, and a SC-PTM PDSCH transmission intended for a group of UEs 404 into a combined signal 410. In an aspect, the first unicast PDSCH transmission (e.g., signal to UE 406) may be a first enhancement layer of the combined signal 410, the second unicast PDSCH transmission (e.g., signal to UE 408) may be a second enhancement layer of the combined signal 410, and the SC-PTM PDSCH signal (e.g., signal to the plurality of UEs 404) may be a base layer of the combined signal 410. The number of layers of the SC-PTM PDSCH transmission in the combined signal 410 may be limited to one. However, more than one SC-PTM layer is possible. In addition, the number of layers for unicast PDSCH data transmissions under in the combined signal 410 maybe one or more. In other words, the unicast PDSCH data transmission may be transmitted using SIMO or SU-MIMO operations. In one aspect, the combined signal 410 may include a first unicast PDSCH data transmission, a second unicast PDSCH data transmission that partially overlaps the resources and/or symbols of the first unicast PDSCH data transmission, and an SC-PTM data transmission that also partially overlaps the resources and/or symbols of the first and/or second unicast PDSCH data transmission.

At 514, the eNB may transmit the combined signal to the first group of UEs and the second group of UEs. In an aspect, the first data transmission and the second data transmission may include at least one overlapping RE. In a further aspect, the first set of symbols and the second set of symbols may differ by at least one symbol. For example, referring to FIG. 4, the eNB 402 may transmit a combined signal 410 to the first group of UEs (e.g., UEs 404) and the second group of UEs (e.g., UEs 406, 408). In an aspect, the combined signal 410 may include a first unicast PDSCH data transmission intended for a first UE 406, a second unicast PDSCH data transmission intended for a second UE 408, and a SC-PTM PDSCH data transmission intended for a group of UEs 404.

Figure 6:
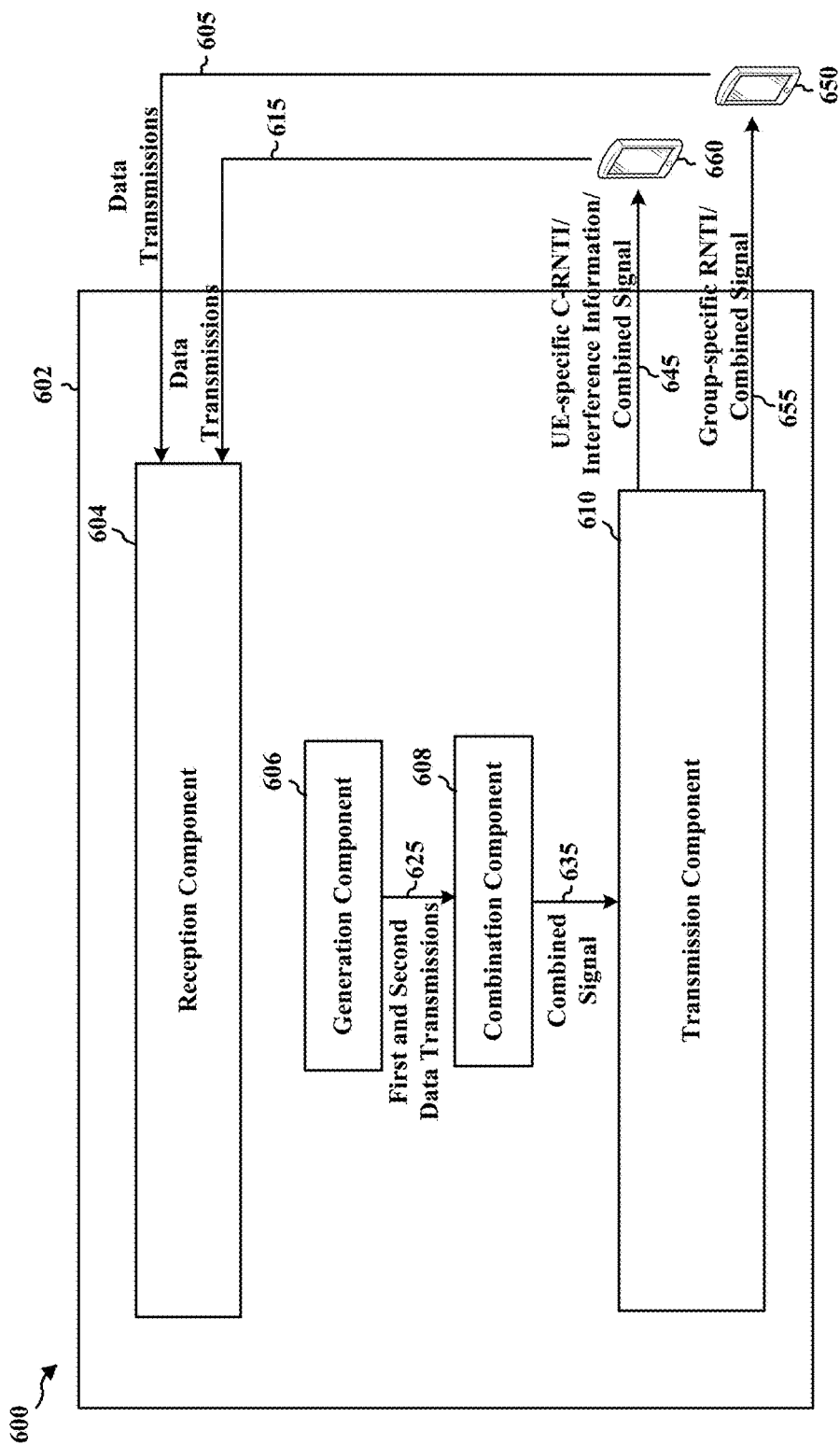
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be an eNB. The apparatus includes a reception component 604 that receives data transmissions 605 from UE 650 (e.g., UE 650 may be in a first group of UEs). In addition, the reception component 604 receives data transmissions 615 from UE 660 (e.g., UE 660 may be in a second group of UEs). The apparatus also includes a generation component 606 that generates a first data transmission for the first group of UEs (e.g., an SC-PTM PDSCH transmission for UE 650 and other UEs). In addition, the generation component 606 generates a second data transmission for the second group of UEs (e.g., a unicast PDSCH transmission for UE 660 and possibly different unicast PDSCH transmissions for different UEs). The generation component 606 may send information 625 associated with the first data transmission and the second data transmission to the combination component 608. The combination component 608 combines the first data transmission 625 and the second data transmission 625 in to a combined signal. In an aspect, the first data transmission and the second data transmission may be combined such that one or more resources and/or symbols of the first data transmission and the second data transmission overlap. The apparatus further includes a transmission component 610 that transmits information 655 associated with a group-specific RNTI and the combined signal to the first group of UEs (e.g., UE 650 and other UEs). Still further, the transmission component 610 transmits information 645 associated with a UE-specific C-RNTI, interference information, and the combined signal to the second group of UEs (e.g., UE 660).

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
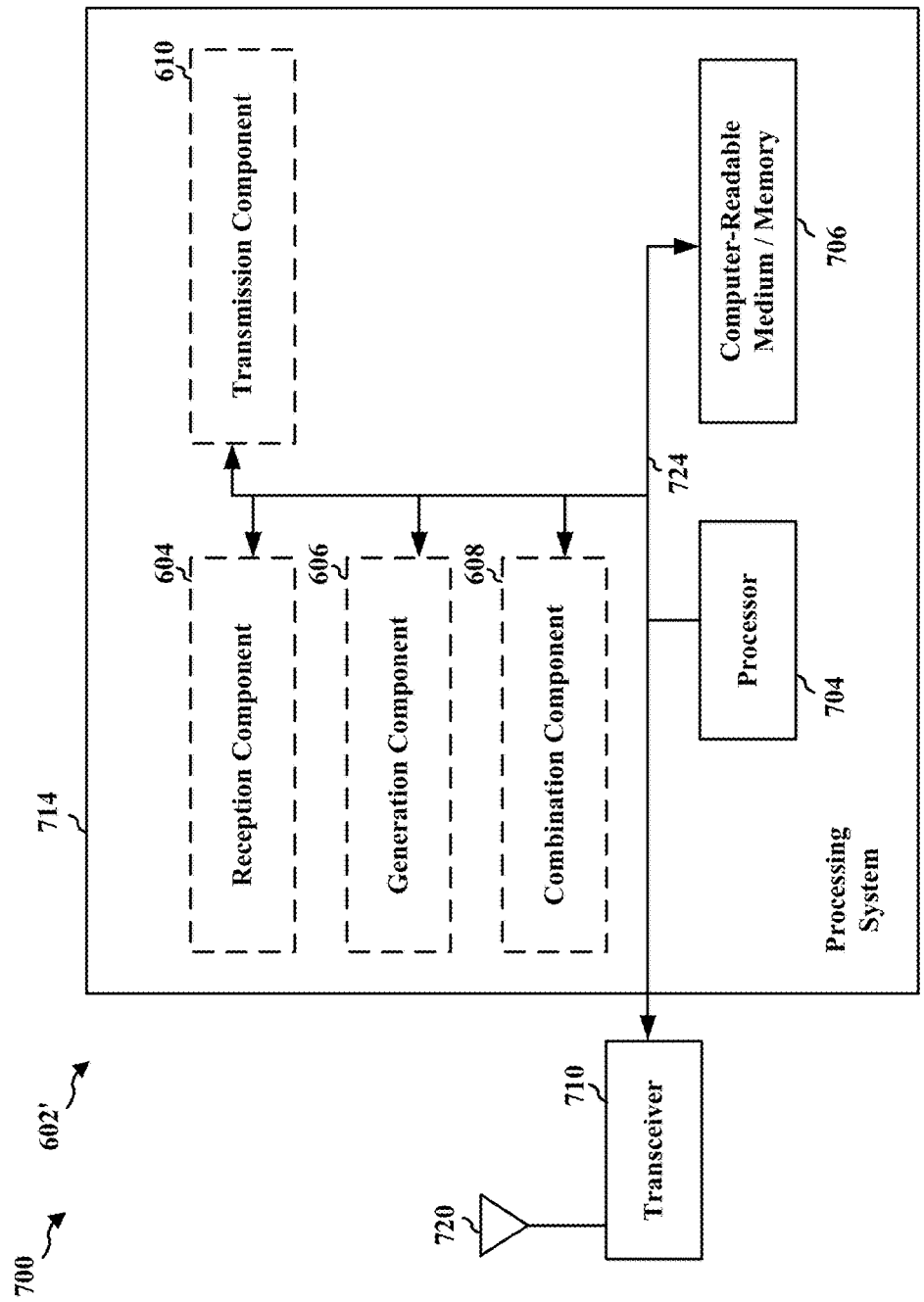
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof. The processing system 714 may be a component of the eNB 310 and may include the memory 376 and/or at least one of the TX processor 316, the RX processor 370, and the controller/processor 375.

In one configuration, the apparatus 602/602' for wireless communication includes means for transmitting a group-specific RNTI to a first group of UEs. In an aspect, the first group of UEs may include a plurality of UEs receiving an SC-PTM transmission. In another configuration, the apparatus 602/602' for wireless communication includes means for transmitting interference cancellation information to a second group of UEs. In a further configuration, the apparatus 602/602' for wireless communication includes means for transmitting a different C-RNTI to each UE in the second group of UEs. In an aspect, the second group of UEs may include one or more UEs receiving a unicast transmission. In yet another configuration, the apparatus 602/602' for wireless communication includes means for generating a first data transmission for the first group of UEs. In still a further aspect, the apparatus 602/602' for wireless communication includes means for generating a second data transmission for the second group of UEs. In an aspect, the first data transmission may be a base layer of the combined signal and the second data transmission may be an enhancement layer of the combined signal. In another aspect, the base layer may include one or more layers. In a further aspect, the enhancement layer may include one or more layers. In an additional aspect, the first data transmission and the second data transmission may be non-orthogonal. In yet another aspect, the first data transmission may be an SC-PTM transmission. Additionally, the second data transmission may include one or more unicast transmissions to the second group of UEs. Still further, the first data transmission may include a first reference signal type and the second data transmission may include a second reference signal type. In one aspect, the first reference signal type and the second reference signal type may be the same. In another aspect, the first reference signal type and the second reference signal type may be different. Furthermore, the first reference signal type and the second reference signal type each includes one of a DM-RS, a UE-RS, or a CRS. In another aspect, the first data transmission and the second data transmission may include a same precoding or a different precoding. Additionally, the first data transmission and the second data transmission may include a same cyclic prefix. Still further, a first set of RBs and/or symbols associated with the first data transmission partially overlap with a second set of RBs associated with the second signal. In a further configuration, the apparatus 602/602' for wireless communication includes means for combining the first signal and the second signal into a combined signal. In another configuration, the apparatus 602/602' for wireless communication includes means for transmitting the combined signal to the first group of UEs and the second group of UEs. In one aspect, the first data transmission and the second data transmission may include at least one overlapping resource element. In another aspect, the first set of symbols and the second set of symbols may differ by at least one symbol. In a further aspect, a starting symbol of the first data transmission may be different than a starting symbol of second data transmission. The aforementioned means may be one or more of the aforementioned components of the apparatus 602 and/or the processing system 714 of the apparatus 602' configured to perform the functions recited by the aforementioned means. As described supra, the processing system 714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 8:
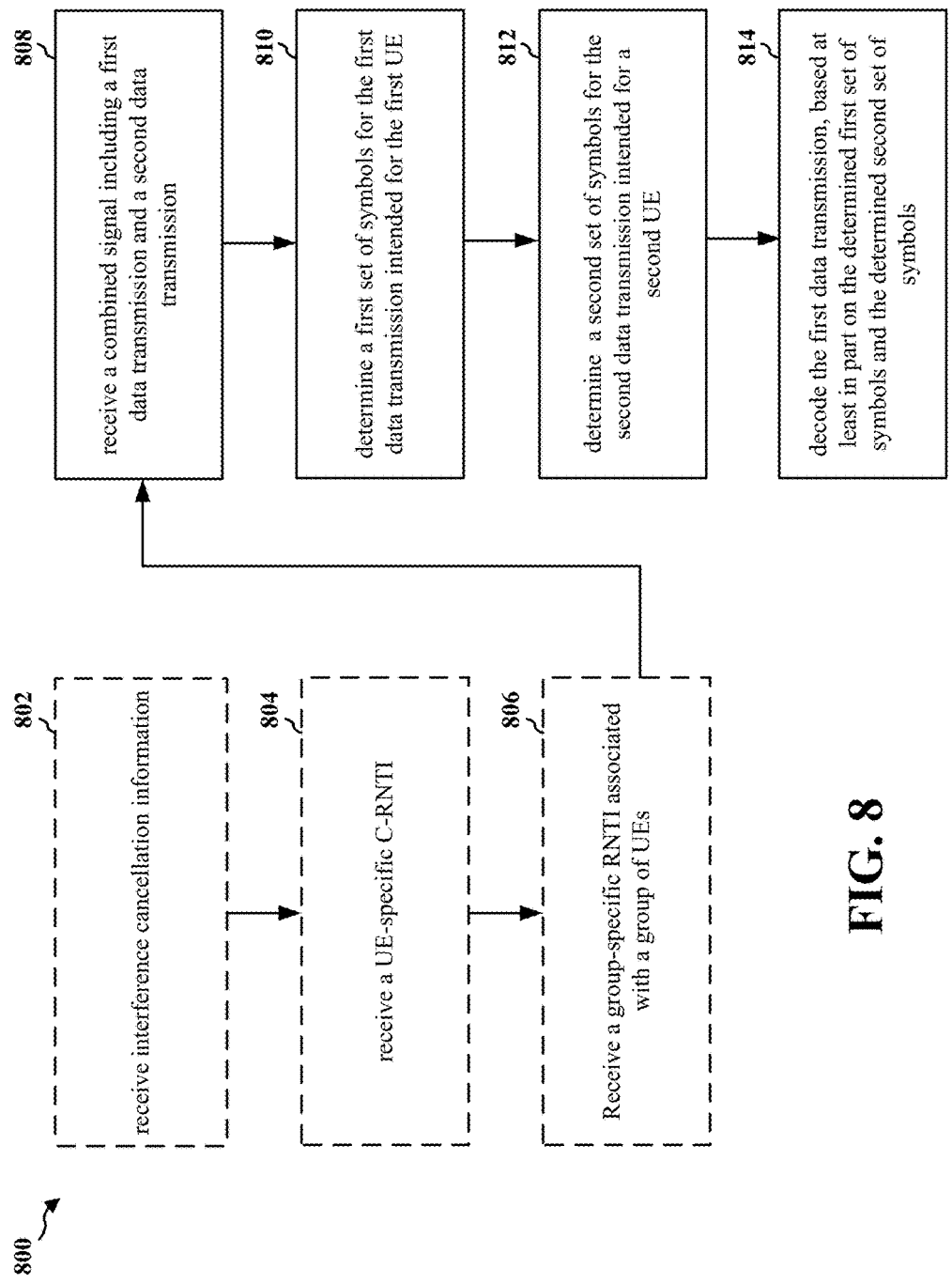
FIG. 8 is a flowchart of a method of wireless communication.

FIG. 8 is a flow chart 800 of a method of wireless communication in accordance with various aspects. The method may be performed by a UE (e.g., the UE 404, 406, 408, the apparatus 902/902'). It should be understood that the operations indicated with dashed lines represent optional operations for various aspects of the disclosure.

At 802, the UE may receive interference cancellation information. For example, referring to FIG. 4, a unicast UE 406 may need to cancel interference when the resources and/or symbols used for SC-PTM PDSCH transmission in the enhancement layer overlap with resources and/or symbols in the first and/or second enhancement layers used for the first and/or second unicast PDSCH transmissions. UE 406 may cancel interference using interference cancellation information 412 received from the eNB 402.

At 804, the UE may receive a UE-specific C-RNTI. For example, referring to FIG. 4, the corresponding control channel and data channel for each of the unicast UEs 406, 408 may each be scrambled by a UE-specific C-RNTI 416, 418 that is signalled from the eNB 402. The eNB 402 may transmit information associated with a unique UE-specific C-RNTI to each UE 406, 408.

At 806, the UE may receive a group-specific RNTI associated with a group of UEs. For example, referring to FIG. 4, the corresponding control channel and data channel of the group of UEs 404 may be scrambled by a group-specific RNTI 414 that is signalled from the eNB 402.

At 808, the UE may receive a combined signal including a first data transmission intended for a first group of UEs and a second data transmission intended for a second group of UEs. For example, referring to FIG. 4, a unicast UE 406 may receive a combined signal 410 including a first unicast PDSCH transmission intended for UE 406, a second unicast PDSCH transmission intended for UE 408, and a SC-PTM PDSCH transmission intended for a group of UEs 404. In addition, the combined signal 410 may include a plurality of layers. For example, the first unicast PDSCH transmission (e.g., signal to UE 406) may be an enhancement layer of the combined signal 410 and the SC-PTM PDSCH transmission (e.g., signal to the plurality of UEs 404) may be a base layer of the combined signal 410.

At 810, the UE may determine a first set of symbols for the first data transmission intended for the first UE. For example, referring to FIG. 4, each of the UEs 404, 406, 408 may determine 415 a first set of symbols in the combined signal 410 for a first data transmission (e.g., the first unicast transmission, the second unicast transmission, or the SC-PTM transmission) intended for that specific UE.

At 812, the UE may determine a second set of symbols for the second data transmission intended for a second UE. For example, referring to FIG. 4, each of the UEs 404, 406, 408 may determine 415 a second set of symbols for one or more second data transmissions (e.g., the first unicast transmission, the second unicast transmission, or the SC-PTM transmission) included in the combined signal 410 intended for a different UE.

At 814, the UE may decode the first data transmission, based at least in part on the determined first set of symbols and the determined second set of symbols For example, referring to FIG. 4, based at least in part on the determined first set of symbols and the determined second set of symbols, each of the UEs 404, 406, 408 may decode 415 the data transmission intended for that specific UE from the combined signal 410. In an aspect, the first data transmission and the second data transmission may include at least one overlapping RE. In a further aspect, the first set of symbols and the second set of symbols differ by at least one symbol. In yet a further aspect, a starting symbol of the first data transmission may be different than a starting symbol of second data transmission. In a first aspect, at least one of the first data transmission or the second data transmission may be decoded based at least in part on the UE-specific RNTI and the interference cancellation information. In a second aspect, at least one of the first data transmission or the second data transmission may be decoded based at least in part on the group-specific RNTI.

Figure 9:
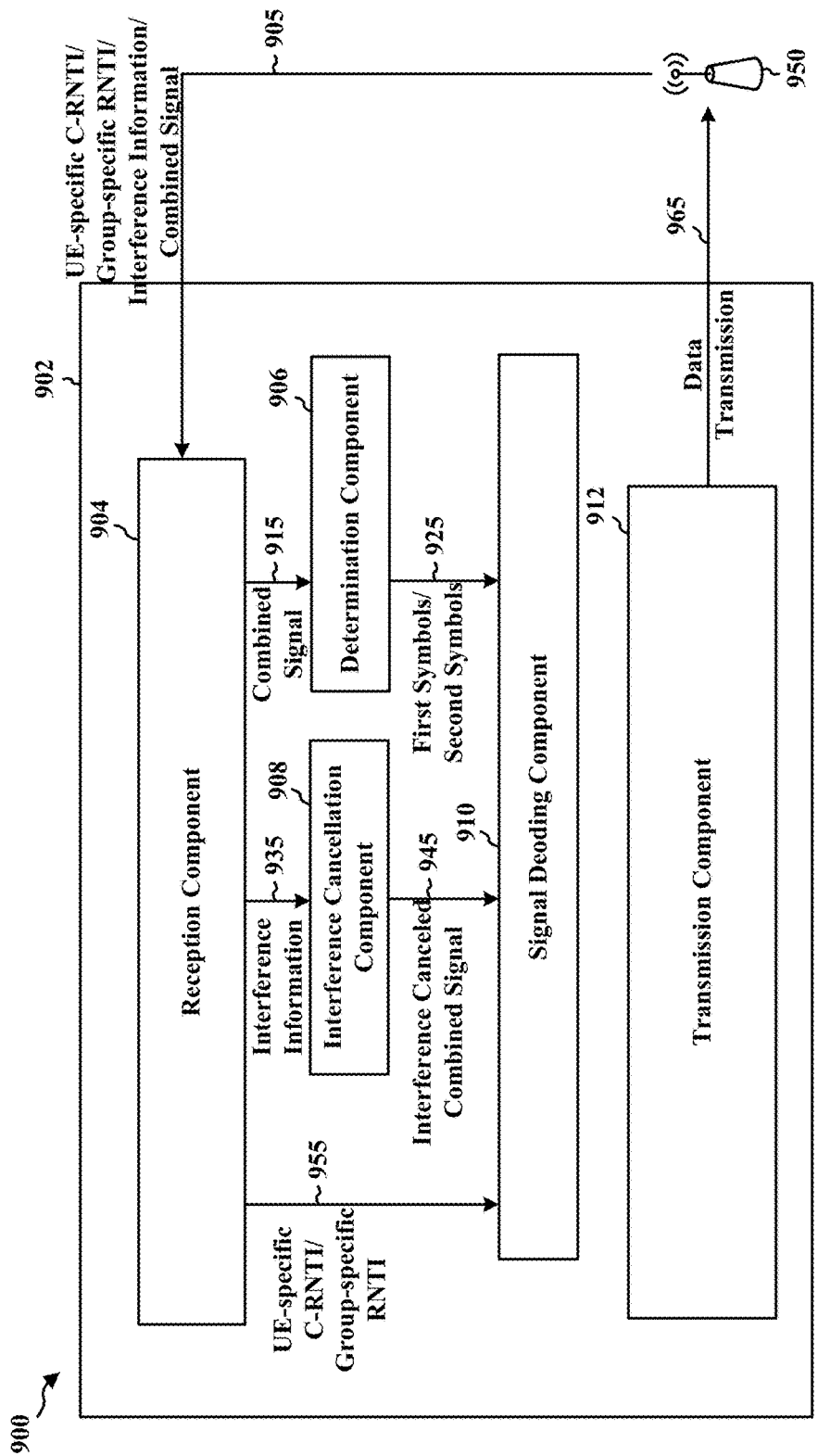
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus includes a reception component 904 that receives one or more of a UE-specific C-RNTI, a group-specific RNTI, interference cancellation information, and/or a combined signal 905 from eNB 950. In an aspect, the combined signal may include a first data transmission intended for a first group of UEs and one or more second data transmissions each intended for a different UE in a second group of UEs. The apparatus also includes a determination component 906 that may receive information 915 associated with the combined signal from the reception component 904. The determination component 906 may determine a first set of symbols associated with the first data transmission intended for the UE and a second set of symbols for the second data transmission intended for a second UE. The determination component 906 may send information 925 associated with the first set of symbols and the second set of symbols to the signal decoding component 910. In addition, the apparatus includes an interference cancellation component 906 that receives interference cancellation information 935 from the reception component 904. In addition, the interference cancellation component 904 cancels interference caused by the second data transmission using the interference information 935. The interference cancellation component 906 may send information 945 associated with the interference cancelled combined signal to the signal decoding component 910. The signal decoding component 910 may also receive information 955 associated with UE-specific C-RNTI and/or group-specific RNTI from the reception component 904. The signal decoding component 910 may decode the first data transmission based on one or more of the first set of symbols and/or second set of symbols determined by the determination component 906, the interference canceled combined signal 945, the UE-specific C-RNTI, and/or the group-specific RNTI 955. The apparatus also includes a transmission component 912 that sends data transmissions 965 to the eNB 950.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
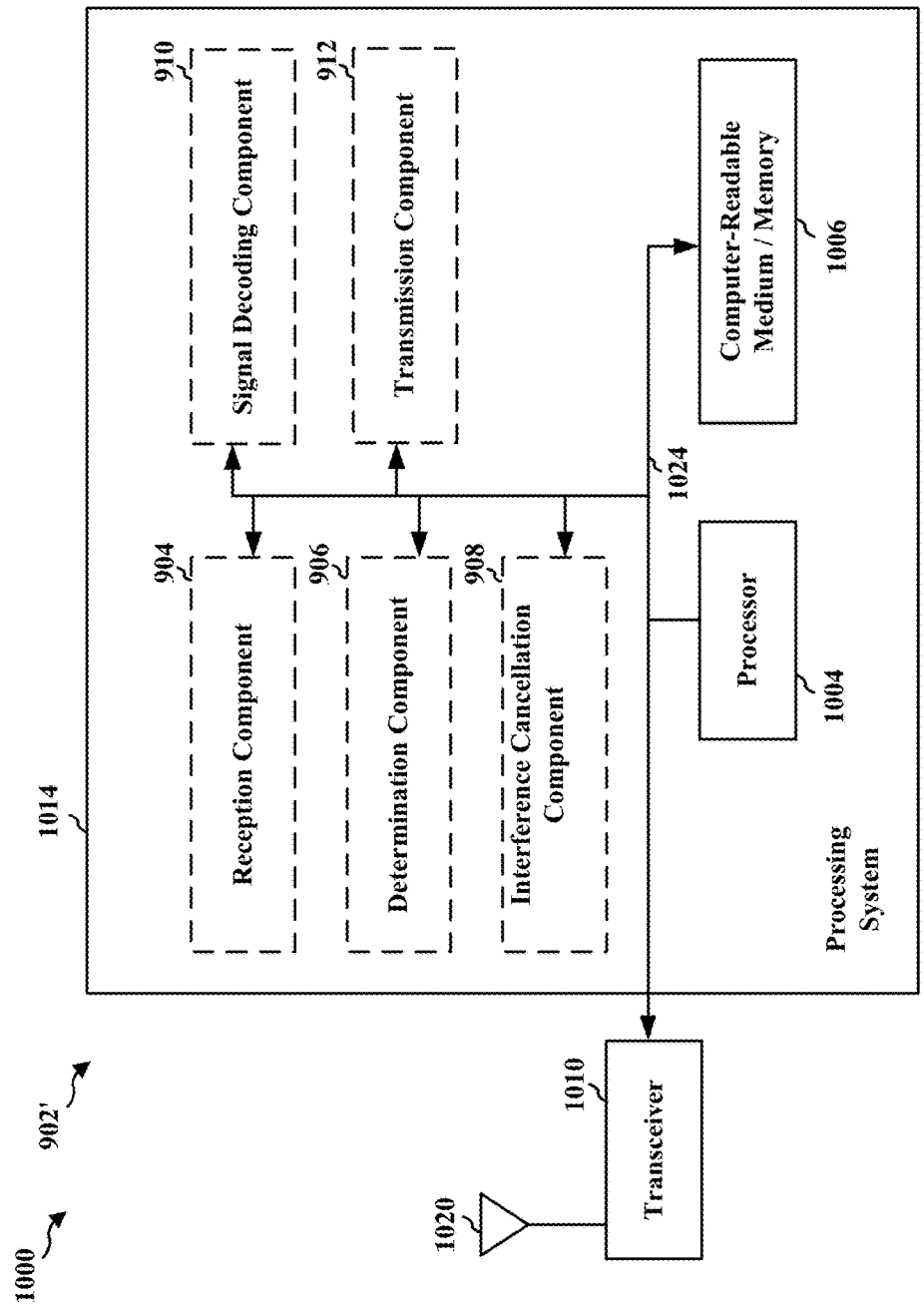
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving, at a first UE, a combined signal including a first data transmission and a second data transmission. In another configuration, the apparatus 902/902' for wireless communication includes means for determining, at the first UE, a first set of symbols for the first data transmission intended for the first UE. In a further configuration, the apparatus 902/902' for wireless communication includes means for determining, at the first UE, a second set of symbols for the second data transmission intended for a second UE. In an aspect, the first data transmission and the second data transmission may include at least one overlapping resource element. In another aspect, the first set of symbols and the second set of symbols may differ by at least one symbol. In a further aspect, a starting symbol of the first data transmission may be different than a starting symbol of second data transmission. In yet another configuration, the apparatus 902/902' for wireless communication includes means for decoding, at the first UE, the first data transmission, based at least in part on the determined first set of symbols and the determined second set of symbols. In one configuration, the apparatus 902/902' for wireless communication includes means for receiving a UE-specific RNTI. In an aspect, the means for decoding may be configured to decode at least one of the first data transmission or the second data transmission based at least in part on the group-specific RNTI. In another configuration, the apparatus 902/902' for wireless communication includes means for receiving a UE-specific RNTI associated with the first UE. In a further configuration, the apparatus 902/902' for wireless communication includes means for receiving interference cancellation information. In an aspect, the means for decoding may be configured to decode at least one of the first data transmission or the second data transmission based at least in part on the UE-specific RNTI and the interference cancellation information. In an aspect, the first data transmission and the second data transmission are non-orthogonal. In another aspect, the first data transmission may be a SC-PTM transmission. In yet a further aspect, the second data transmission comprises one or more unicast transmissions. In one aspect, the second data transmission may be a base layer of the combined signal and the first data transmission may be an enhancement layer of the combined signal. In another aspect, the base layer includes one or more layers. In a further aspect, the enhancement layer may include one or more layers. In addition, the first data transmission and the second data transmission are non-orthogonal. Furthermore, at least one of the first data transmission or the second data transmission is a SC-PTM transmission. In another aspect, at least one of the first data transmission or the second data transmission comprises one or more unicast transmissions. In a further aspect, the first data transmission may include a first reference signal type and the second data transmission may include a second reference signal type. In yet another aspect, the first reference signal type and the second reference signal type may be a same type. In a different aspect, the first reference signal type and the second reference signal type may be a different type. In a further aspect, the first reference signal type and the second reference signal type each include one of a DM-RS, a UE-RS, or a CRS. In another aspect, wherein the first data transmission and the second data transmission may include a same precoding. Additionally, a first precoding associated with the first data transmission may be different than a second precoding associated with the second data transmission. Moreover, the first data transmission and the second data transmission may include a same cyclic prefix. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    receiving, at a first user equipment (UE), a combined signal including a first data transmission and a second data transmission, wherein at least one of the first data transmission or the second data transmission is a single-cell point-to-multipoint (SC-PTM) transmission;
    determining, at the first UE, a first set of symbols for the first data transmission intended for the first UE;
    determining, at the first UE, a second set of symbols for the second data transmission intended for a second UE, wherein the first data transmission and the second data transmission include at least one overlapping resource element, and wherein the first set of symbols and the second set of symbols differ by at least one symbol; and
    decoding, at the first UE, the first data transmission, based at least in part on the determined first set of symbols and the determined second set of symbols, wherein the first data transmission is decoded without performing interference cancellation when the first data transmission is the SC-PTM transmission.

2. The method of claim 1, wherein a starting symbol of the first data transmission is different than a starting symbol of second data transmission.

3. The method of claim 1, further comprising:
    receiving a group-specific radio network temporary identifier (RNTI) associated with a group of UEs,
        wherein at least one of the first data transmission or the second data transmission is decoded based at least in part on the group-specific RNTI.

4. The method of claim 1, further comprising:
    receiving a UE-specific radio network temporary identifier (RNTI) associated with the first UE; and
    receiving interference cancellation information,
        wherein at least one of the first data transmission or the second transmission is decoded based at least in part on the UE-specific RNTI and the interference cancellation information.

5. The method of claim 1, wherein the second data transmission is a base layer of the combined signal and the first data transmission is an enhancement layer of the combined signal.

6. The method of claim 5, wherein the base layer includes one or more layers.

7. The method of claim 5, wherein the enhancement layer includes one or more layers.

8. The method of claim 1, wherein the first data transmission and the second data transmission are non-orthogonal.

9. The method of claim 1, wherein at least one of the first data transmission or the second data transmission comprises one or more unicast transmissions.

10. The method of claim 1, wherein the first data transmission includes a first type of reference signal and the second data transmission includes a second type of reference signal.

11. The method of claim 10, wherein the first type of reference signal and the second type of reference signal are the same.

12. The method of claim 10, wherein the first type of reference signal and the second type of reference signal are different.

13. The method of claim 10, wherein the first type of reference signal and the second type of reference signal each include one of a demodulation reference signal (DM-RS), a UE-specific reference signal (UE-RS), or a cell-specific reference signal (CRS).

14. The method of claim 1, wherein the first data transmission and the second data transmission include a same precoding.

15. The method of claim 1, wherein a first precoding associated with the first data transmission is different than a second precoding associated with the second data transmission.

16. The method of claim 1, wherein the first data transmission and the second data transmission include a same cyclic prefix.

17. A method of wireless communication, comprising:
    generating a first data transmission for a first group of user equipments (UEs), wherein the first data transmission is a single-cell point-to-multipoint (SC-PTM) transmission;
    generating a second data transmission for a second group of UEs;
    combining the first data transmission and the second data transmission into a combined signal such that interference cancellation is not performed when the first data transmission is decoded by the first group of UEs; and
    transmitting the combined signal to the first group of UEs and the second group of UEs,
        wherein the first data transmission and the second data transmission include at least one overlapping resource element, and wherein a first set of symbols of the first data transmission and a second set of symbols of the second data transmission differ by at least one symbol.

18. The method of claim 17, further comprising:
    transmitting a group-specific radio network temporary identifier (RNTI) to the first group of UEs;
    transmitting interference cancellation information to the second group of UEs; and
    transmitting a different UE-specific RNTI to each UE in the second group of UEs.

19. The method of claim 17, wherein:
    the first data transmission is a base layer of the combined signal and the second data transmission is an enhancement layer of the combined signal,
    the base layer includes one or more layers,
    the enhancement layer includes one or more layers, and
    the second data transmission comprises one or more unicast transmissions.

20. An apparatus for wireless communication, comprising:
    means for receiving, at a first user equipment (UE), a combined signal including a first data transmission and a second data transmission;
    means for determining, at the first UE, a first set of symbols for the first data transmission intended for the first UE, wherein at least one of the first data transmission or the second data transmission is a single-cell point-to-multipoint (SC-PTM) transmission;
    means for determining, at the first UE, a second set of symbols for the second data transmission intended for a second UE, wherein the first data transmission and the second data transmission include at least one overlapping resource element, and wherein the first set of symbols and the second set of symbols differ by at least one symbol; and means for decoding, at the first UE, at least one of the first data transmission, based at least in part on the determined first set of symbols and the determined second set of symbols, wherein the first data transmission is decoded without performing interference cancellation when the first data transmission is the SC-PTM transmission.

21. The apparatus of claim 20, wherein a starting symbol of the first data transmission is different than a starting symbol of second data transmission.

22. The apparatus of claim 20, further comprising:
means for receiving a group-specific radio network temporary identifier (RNTI) associated with a group of UEs,
wherein the means for decoding is configured to decode at least one of the first data transmission or the second data transmission based at least in part on the group-specific RNTI.

23. The apparatus of claim 20, further comprising:
means for receiving a UE-specific radio network temporary identifier (RNTI) associated with the first UE; and
means for receiving interference cancellation information,
wherein the means for decoding is configured to decode at least one of the first data transmission or the second data transmission based at least in part on the UE-specific RNTI and the interference cancellation information.

24. The apparatus of claim 20, wherein:
the second data transmission is a base layer of the combined signal and the first data transmission is an enhancement layer of the combined signal,
the base layer includes one or more layers, and
the enhancement layer includes one or more layers.

25. An apparatus for wireless communication, comprising:
a memory; and
at least one processor coupled to the memory and configured to:
receive, at a first user equipment (UE), a combined signal including a first data transmission and a second data transmission, wherein at least one of the first data transmission or the second data transmission is a single-cell point-to-multipoint (SC-PTM) transmission;
determine, at the first UE, a first set of symbols for a first data transmission intended for the first UE;
determine, at the first UE, a second set of symbols for a second data transmission intended for a second UE, wherein the first data transmission and the second data transmission include at least one overlapping resource element, and wherein the first set of symbols and the second set of symbols differ at least by one symbol; and
decode, at the first UE, the first data transmission, based at least in part on the determined first set of symbols and the determined second set of symbols, wherein the first data transmission is decoded without performing interference cancellation when the first data transmission is the SC-PTM transmission.

26. The apparatus of claim 25, wherein a starting symbol of the first data transmission is different than a starting symbol of second data transmission.

27. The apparatus of claim 25, wherein the at least one processor is further configured to:
receive a group-specific radio network temporary identifier (RNTI) associated with a group of UEs,
wherein the at least one processor is configured to decode at least one of the first data transmission or the second data transmission based at least in part on the group-specific RNTI.

28. The apparatus of claim 25, wherein the at least one processor is further configured to:
receive a UE-specific radio network temporary identifier (RNTI) associated with the first UE; and
receive interference cancellation information,
wherein the at least one processor is configured to decode at least one of the first data transmission or the second data transmission based at least in part UE-specific RNTI and the interference cancellation information.

29. The apparatus of claim 25, wherein:
the second data transmission is a base layer of the combined signal and the first data transmission is an enhancement layer of the combined signal,
the base layer includes one or more layers, and
the enhancement layer includes one or more layers.

* * * * *